Patented May 3, 1949

2,469,326

UNITED STATES PATENT OFFICE 2,469,326

INTERPOLYMERIZATION OF THIOPHENE AND BUTADIENE

Philip D. Caesar, Wenonah, and Alexander N. Sachanen, Woodbury, N. J., assignors to Socony-Vacuum Oil Company, Incorporated, a corporation of New York No Drawing. Application November 15, 1944, Serial No. 563,628

8 Claims. (Cl. 260—93)

This invention relates to the interpolymerization of thiophene or of alkyl thiophenes with butadiene, and is more particularly concerned with the method of preparing valuable thermoplastic synthetic products through the catalytic interpolymerization of thiophene or of alkyl thiophenes with butadiene.

Polymerization reactions are well known and connote condensation reactions involving molecules of unsaturated compounds. Thus, it is well known in the art to effect a union between molecules of an unsaturated organic compound to produce a product called a homopolymer, the molecular weight of which is an even multiple of the molecular weight of the original unsaturated organic compound. The operation has been called homopolymerization and the conditions of temperature, pressure, etc., have been called homopolymerizing conditions. The union may also take place between and/or among molecules of two or more dissimilar unsaturated organic compounds to produce products that represent additions of two or more unsaturated organic compounds. The products thus obtained have been referred to as interpolymers as distinguished from the compounds obtained when molecules of an unsaturated organic compound condense with themselves, and the operation has been called interpolymerization.

As is well known to those familiar with the art, homopolymerization and interpolymerization reactions are generally carried out in the presence of substances or of mixtures of substances that promote the homopolymerization or interpolymerization reaction. These substances have been termed homopolymerization or interpolymerization catalysts, depending upon the type of reaction they catalyze, and among the substances most widely used are phosphoric acid, sulfuric acid, anhydrous hydrogen fluoride, metal halides, and boron trifluoride.

It is also well known, that both thiophene and butadiene manifest a strong tendency to homopolymerize in the presence of polymerization catalysts. However, although thiophene will homopolymerize readily in the presence of very active polymerization catalysts such as sulfuric acid, it will not homopolymerize or at least manifest little tendency to homopolymerize in the presence of mild polymerization catalysts such as benzoyl peroxide. On the other hand, butadiene will homopolymerize readily in the presence of either strong or weak polymerization catalysts.

We have now found that thiophene or alkyl thiophenes can be interpolymerized with butadiene to produce valuable synthetic products. In contrast to other well known synthetic resins which possess thermosetting properties and become permanently infusible under the influence of heat, our products possess thermoplastic properties. Although sufficiently rigid at room temperature, our products can be remolded when desired through the application of heat and pressure.

Accordingly, it is an object of the present invention to provide a method of effecting the interpolymerization of thiophene with butadiene. Another object is to provide a method of effecting the interpolymerization of alkyl thiophenes with butadiene. A very important object is to afford a method of preparing valuable synthetic products. A more specific object is to provide a method capable of carrying out the aforementioned objects by effecting the interpolymerization of thiophene or of alkyl thiophenes with butadiene in the presence of sulfuric acid as interpolymerization catalyst. Other objects and advantages of the present invention will become apparent to those skilled in the art from the following description.

Broadly stated, our invention provides a method of producing valuable synthetic products, which comprises contacting thiophene or alkyl thiophenes and butadiene with sulfuric acid, under interpolymerizing conditions.

The rate and control of the interpolymerization reaction between thiophene or alkyl thiophenes and butadiene depend primarily upon the concentration of sulfuric acid in the system and upon the magnitude of the time during which contact between the reactants and the sulfuric acid is maintained; and secondarliy, upon the relative amounts of reactants used and upon the temperature employed. These factors may vary in character or magnitude; hence, they may be referred to, and more appropiately, as reaction variables. It must be understood, however, that they are more or less interdependent. Therefore, when one is arbitrarily fixed, the limits within which the others may be varied are somewhat restricted. In any particular case, the most desirable magnitude of each of the reaction variables can be readily ascertained by one skilled in the art, the limits within which these reaction variables may vary being indicated hereinafter.

It must be noted that in accordance with our invention, not only thiophene, but various alkyl thiophenes may be used in the interpolymerization reaction. 3-methyl thiophene and 3,4-dimethyl thiophene may be mentioned by way of non-limiting examples.

The amount of sulfuric acid to be used for carrying the interpolymerization between thiophene and butadiene depends primarily upon the concentration of the sulfuric acid employed and secondarily upon the time during which contact between the reactants and the sulfuric acid is maintained. Generally speaking, the time required to effect interpolymerization or the desired degree of resinification varies inversely with the amount of sulfuric acid employed. As stated hereinbefore, the important factor to be considered in connection with the amounts of sulfuric acid used is the concentration of sulfuric acid produced in the system. Accordingly, we have found that a concentration of sulfuric acid in the system varying between about 5% and about 100% based on the total weight of the reactants will bring about the desired resinification in a period of time varying between about 24 hours and about one hour.

Other reaction variables remaining constant, the ratio of thiophene reactant to butadiene reactant controls the rate of interpolymerization. Ordinarily, we prefer to use a charge in which the thiophene reactant and the butadiene reactant are present in a molecular proportion of about 1–3:3–1, respectively. If a considerable molecular excess of thiophene is employed, the resin loses some of its plasticity.

The temperature at which the interpolymerization is carried out controls to a certain extent the rate at which the reaction takes place. Ordinarily, we prefer to use temperatures varying between about 10° C. and about 40° C. It must be noted, however, that the reaction is so exothermic that the temperature during the reaction may become as high as 100° C. unless steps are taken to control the temperature. The temperature, and as already noted, the time of reaction, are governed to a considerable extent by the concentration of the sulfuric acid in the system. Hence, the optimum temperature and time for effecting the interpolymerization and desired degree of resinification must be determined by one skilled in the art, the essential factor to be considered in addition to the time and temperature of reaction, being the concentration of sulfuric acid in the system.

The products produced in accordance with our invention, have properties that make them amenable to a variety of commercial uses. They are somewhat linear in structure and therefore may be added to oils to improve their viscosity index or may be used as synthetic rubber-like compounds.

The relationship of each of the reaction variables will become apparent from the following examples:

All the tests were carried out by placing the thiophene, the butadiene, and the sulfuric acid in a glass tube, sealing the tube and shaking the contents for the periods of time and at the temperatures indicated. A water bath was used as a heat transfer medium to control to some extent the exothermic reaction.

The results show that the concentration of sulfuric acid in the system affects the degree of interpolymerization achieved.

The present invention may be embodied in other specific forms without departing from the essential attributes thereof, and it is therefore desired that the present embodiments be considered in all respects as illustrative and not restrictive, reference being had to the appended claims rather than to the foregoing description to indicate the scope of the invention.

We claim:

1. A method of producing valuable synthetic products, which comprises contacting a thiophene reactant selected from the group consisting of thiophene, and monoalkyl thiophenes and dialkyl thiophenes wherein the alkyl substituent is a low molecular weight alkl group, with butadiene-1,3 in a molecular proportion of thiophene reactant to butadiene-1,3 of 1–3:3–1, in the presence of sulfuric acid in amounts to produce a concentration of sulfuric acid in the system varying between about 5 per cent and about 100 per cent based on the total weight of the thiophene reactant and butadiene-1,3 in the charge, and for a period of time sufficient to effect resinification.

2. A method of producing valuable synthetic products, which comprises contacting thiophene with butadiene-1,3 in a molecular proportion of thiophene to butadiene-1,3 of 1–3:3–1, in the presence of sulfuric acid in amounts to produce a concentration of sulfuric acid in the system varying between about 5 per cent and about 100 per cent based on the total weight of the thiophene and butadiene-1,3 in the charge, at a temperature varying between about 10° C. and about 40° C., and for a period of time sufficient to effect resinification.

3. A method of producing valuble synthetic products, which comprises contacting a monoalkyl thiophene wherein the alkyl substituent is a low molecular weight alkyl group with butadiene-1,3 in a molecular proportion of monoalkyl thiophene to butadiene-1,3 of 1–3:3–1, in the presence of sulfuric acid in amounts to produce a concentration of sulfuric acid in the system varying between about 5 per cent and about 100 per cent based on the total weight of the monoalkyl thiophene and butadiene-1,3 in the charge, at a temperature varying between about 10° C. and about 40° C., and for a period of time sufficient to effect resinification.

| Example No. | 1 | 2 | 3 | 4 | 5 | 6 |
|---|---|---|---|---|---|---|
| Thiophene in grams | 10 | 10 | 10 | 10 | 10 | 10. |
| Butadiene in grams | 12 | 12 | 12.5 | 12.5 | 12.6 | 12. |
| Sulfuric Acid: | | | | | | |
|   Volume in c. c. | 10 | 10 | 5 | 4 | 2 | 1. |
|   Strength in per cent | 78 | 78 | 78 | 96 | 96 | 78. |
|   Weight in grams | 13 | 13 | 6.5 | 7.2 | 3.6 | 1.3. |
|   Concentration in system in per cent by weight | 37 | 37 | 22.4 | 17.7 | 11.7 | 5.6. |
| Glacial Acetic acid in grams | | | | 11 | 5.5 | |
| Temperature in ° C | 20–30 | 20–30 | 20–30 | 20–30 | 20–30 | 20–30. |
| Time in hours | 60 | 12 | 60 | 2 | 2 | 60. |
| Product: | | | | | | |
|   Weight in grams | 15–20 | 15–20 | 15–20 | 15–20 | 15–20 | trace. |
|   At 20° C | waxy, Black plastic. | gummy, dark plastic. | orange plastic. | dark plastic. | brown plastic. | orange plastic. |
|   At 80–90° C | viscous oil | viscous oil | viscous oil | viscous oil | viscous oil | viscous oil. |
|   Specific Gravity | >1 | >1 | >1 | >1 | >1 | >1. |

4. The product obtained by contacting a thiophene reactant selected from the group consisting of thiophene, and monoalkyl thiophenes and dialkyl thiophenes wherein the alkyl substituent is a low molecular weight alkyl group, with butadiene-1,3 in a molecular proportion of thiophene reactant to butadiene-1,3 of 1–3:3–1, in the presence of sulfuric acid in amounts to produce a concentration of sulfuric acid in the system varying between about 5 per cent and about 100 per cent based on the total weight of the thiophene reactant and butadiene-1,3 in the charge, and for a period of time sufficient to effect resinification.

5. The product obtained by contacting thiophene with butadiene-1,3 in a molecular proportion of thiophene to butadiene-1,3 of 1–3:3–1, in the presence of sulfuric acid in amounts to produce a concentration of sulfuric acid in the system varying between about 5 per cent and about 100 per cent based on the total weight of the thiophene and butadiene-1,3 in the charge, at a temperature varying between about 10° C. and about 40° C., and for a period of time sufficient to effect resinification.

6. The product obtained by contacting a monoalkyl thiophene wherein the alkyl substituent is a low molecular weight alkyl group with butadiene-1,3 in a molecular proportion of monoalkyl thiophene to butadiene-1,3 of 1–3:3–1, in the presence of sulfuric acid in amounts to produce a concentration of sulfuric acid in the system varying between about 5 per cent and about 100 per cent based on the total weight of the monoalkyl thiophene and buotadiene-1,3 in the charge, at a temperature varying between about 10° C. and about 40° C., and for a period of time sufficient to effect resinification.

7. A method of producing valuable synthetic products, which comprises contacting a dialkyl thiophene wherein the alkyl substituent is a low molecular weight alkyl group, with butadiene-1,3 in a molecular proportion of dialkyl thiophene to butadiene-1,3 of 1–3:3–1, in the presence of sulfuric acid in amounts to produce a concentration of sulfuric acid in the system varying between about 5 per cent and about 100 per cent based on the total weight of the dialkyl thiophene and butadiene-1,3 in the charge, at a temperature varying between about 10° C. and about 40° C. and for a period of time sufficient to effect resinification.

8. The product obtained by contacting a dialkyl thiophene wherein the alkyl substituent is a low molecular weight alkyl group, with butadiene-1,3 in a molecular proportion of dialkyl thiophene to butadiene-1,3 of 1–3:3–1, in the presence of sulfuric acid in amounts to produce a concentration of sulfuric acid in the system varying between about 5 per cent and about 100 per cent based on the total weight of the dialkyl thiophene and butadiene-1,3 in the charge, at a temperature varying between about 10° C. and about 40° C., and for a period of time sufficient to effect resinification.

PHILIP D. CAESAR.
ALEXANDER N. SACHANEN.

REFERENCES CITED

The following references are of record in the file of this patent:

UNITED STATES PATENTS

| Number | Name | Date |
|---|---|---|
| 1,894,661 | Brooks | Jan. 17, 1933 |
| 2,008,491 | Ebert | July 16, 1935 |

OTHER REFERENCES

Beilstein Handbuch der organische Chemie, vol. 17, p. 20, 4th edition. (Copy in Div. 6.)